United States Patent [19]

Bilyk et al.

[11] 4,124,609

[45] Nov. 7, 1978

[54] POLYOLS FROM EPOXIDIZED TALLOW TRIMETHYLOLPROPANE AND PROPYLENE OXIDE

[75] Inventors: Alexander Bilyk, Philadelphia; Edward J. Saggese, Upper Darby; Harry A. Monroe, Jr., North Wales, all of Pa.

[73] Assignee: The United States of America as represented by the Secretary of Agriculture, Washington, D.C.

[21] Appl. No.: 750,339

[22] Filed: Dec. 13, 1976

[51] Int. Cl.$^2$ .......................... C09F 5/08; C11C 3/00
[52] U.S. Cl. ................................ 260/406; 260/410.6; 260/22 EP
[58] Field of Search ................ 260/410.6, 22 EP, 406

[56] References Cited

U.S. PATENT DOCUMENTS

| | | | |
|---|---|---|---|
| 3,399,154 | 8/1968 | Bernstein et al. | 260/410.6 X |
| 3,689,532 | 9/1972 | Emmons et al. | 260/410.6 X |

OTHER PUBLICATIONS

Bilyk et al., AOCS 67th Annual Spring Meeting, Apr. 21–24, 1976, Session I, Report #46.
Bilyk et al., Journal of the American Oil Chemists' Society, vol. 52, pp. 289–292 (1975).

*Primary Examiner*—John Niebling
*Attorney, Agent, or Firm*—M. Howard Silverstein; William E. Scott; David G. McConnell

[57] ABSTRACT

Polyols suitable for use in urethane foams are made by a three-stage process that is much less dependent on petroleum-based chemicals than are prior art methods and that eliminates washing unreacted reagents out of the product. Trimethylolpropane is first reacted under acid catalysts with epoxidized tallow, the reacted epoxidized tallow is then reacted under alkaline catalysis with trimethylolpropane, and the resilient product reacted with propylene oxide.

9 Claims, No Drawings

POLYOLS FROM EPOXIDIZED TALLOW TRIMETHYLOLPROPANE AND PROPYLENE OXIDE

BACKGROUND OF THE INVENTION

1. Field of the Invention

This invention relates to polyols and more particularly to a new three stage process for the preparation of polyols suitable for use in urethane foams.

2. Description of the Prior Art

Polyols suitable for use in urethane foams are usually made industrially by treating compounds very rich in hydroxyl with an alkylene oxide such as ethylene or propylene oxide, under alkaline catalysis, to give oxyalkylated products with moderate hydroxyl content. The compounds very rich in hydroxyl are usually obtained from either petroleum chemicals or carbohydrates, but the alkylene oxide is almost always derived from petroleum-based chemicals. Dependence on petroleum-based chemicals can be partially alleviated by making polyols by reaction of a compound very rich in hydroxyl, such as trimethylolpropane (TMP), with an agriculturally based fatty glyceride such as epoxidized tallow. This reaction can be carried out by heating with acid catalysts such as $BF_3$ or HBr (J. Am. Oil Chemists' Soc. 51, 119-123 (1974); J. Am. Oil Chemists' Soc. 52, 289-292 (1975)). The TMP reacts in part with the glyceride linkages of the epoxidized tallow to give a mixture of mono- and diglycerides and fatty esters of TMP. The TMP also reacts at the oxirane linkages of the epoxidized tallow to give rise to fatty hydroxy ethers of TMP. The reaction mixture is a mixture of polyalcohols of moderate hydroxyl content and appropriate plasticizing character for good quality rigid urethane foams on reaction with an appropriate isocyanate and a blowing agent. Unfortunately, some of the TMP fails to react either at glyceride or oxirane function and consequently forms a second phase which solidifies out on standing at room temperature. Although, in the laboratory, most of the unreacted TMP can be eliminated by water-washing a solution of the polyol in a hydrocarbon solvent, the necessity of such a step would be a stumbling block to commercial adoption of the process.

SUMMARY OF THE INVENTION

An object of this invention is to provide a method of making polyols that is less dependent than current procedures on petroleum-based chemicals.

Another object of this invention is to provide a method of making polyols which eliminates the need for washing unreacted reagents out of the product.

According to this invention the above objects are accomplished by a three stage process wherein trimethylolpropane is first reacted under acid catalysis with epoxidized tallow, the so-reacted epoxidized tallow is then reacted, under alkaline catalysis, with trimethylolpropane, and the resultant product reacted with propylene oxide.

DETAILED DESCRIPTION OF THE INVENTION

The process of this invention is a three stage reaction. In the first stage, under acid catalysis, the predominant reaction is that of TMP with the oxirane groups of the epoxidized tallow to give fatty hydroxy ethers of TMP. In the second stage, alkali catalyzes ester interchange and the TMP reacts more extensively with the glyceride linkages of the epoxidized tallow to give mono- and diglycerides and fatty esters of TMP thus conferring hydroxyl functionality on the non-epoxidized acyl groups of the tallow glycerides as well as on the epoxidized ones. In the third stage, propylene oxide reacts with all the hydroxyl-bearing components of the reaction mixture to yield a homogeneous mixture of polyalcohols. This homogeneous mixture constitutes a polyol of hydroxyl content and plasticizing character suitable for the preparation of urethane foams. The fatty moieties in the mixture confer plasticizing and lipophilic properties to the product.

It is noted that in the process of this invention, homogeneity is obtained without resorting to the costly and troublesome washing step necessary in the processes of the prior art. Good quality, high- and low-density urethane foams are prepared by treating the homogeneous mixture of polyols with appropriate isocyanates and blowing agents.

In practicing the invention we have found it convenient to choose the amounts of TMP and epoxidized tallow to be reacted in terms of their functional ratio, that is, the ratio of the number of moles of hydroxyl function provided by the TMP to the number of moles of oxirane plus ester function provided by the epoxidized tallow. We have also found that the functional ratio can be varied widely and that particularly good results are obtained at functional ratios from about 1.4 to about 6.6. In addition, we found that once the mixture of polyols is homogeneous, its hydroxyl content can be varied widely for whatever practical application is desired by adjusting the amount of propylene oxide fixed in the reaction. For the purposes of this invention, in experiments similar to those set forth in Examples 1 and 2, the hydroxyl content was varied between about 6 and 16%.

The following examples illustrate the process of this invention.

EXAMPLE 1

175.8 gm (1.31 moles) of TMP was melted in a 3-necked flask equipped with thermometer, mechanical stirrer, reflux condenser and additional funnel. An oil bath controlled by an electronic thermoregulator provided the necessary heat. Twenty-six ml of a 20% ether solution of $BF_3$ catalyst was introduced with continuous stirring. The ether readily evaporated, and the $BF_3$ went into solution in the TMP. It represented an 0.5% concentration based on the weight of total reaction mixture. To the TMP solution, 350 gm of melted epoxidized tallow (3.28% oxirane and 186.9 ester no.) was added slowly. The amounts of reactants used in this example represent a functional ratio of 2.1. The temperature of the mixture was raised gradually to about 120° C., and the reaction was carried out for the period of about 1 hr. This time was sufficient to consume all epoxy groups by reaction with TMP. The $BF_3$ catalyst was now removed by sweeping with $N_2$ gas, and 5.3 gm (0.094 moles) of KOH pellets was added (providing a 1% concentration of KOH based on the weight of the total mixture). The reaction was continued, under the same conditions for about an additional 4 hrs. Then the temperature of the mixture was raised to about 150 C. and 171.4 gm (2.95 moles) of propylene oxide was added dropwise from the addition funnel under a nitrogen atmosphere, at the rate of about 2 ml per minute. The total reaction time was about 7 hrs. The reaction mixture was then neutralized with concentrated hydrochloric acid (total inorganic in product 7 gm) and dried in a rotary evaporator under 0.25 mm pressure. The final product, weighing 687.8 gm, was amber colored and liquid at room temperature. The weight increase, based on the weight of epoxidized tallow, was 96.5%. During the oxypropylation reaction 162.0 gm (2.79 moles) of propylene oxide were fixed (0.71 moles of propylene oxide per mole of OH from TMP). The resultant polyol was analyzed for viscosity and hydroxyl content. Thin layer chromatography (TLC) showed no unoxypropylated TMP in the product. Properties of polyol: hydroxyl equivalent, 183; viscosity (Brookfield) at 25 C, 5,825 cps. This product was ready for use in preparation of both low and high density rigid urethane foams.

EXAMPLE 2

318.0 gm (2.37 moles) of TMP was melted in a 3-necked flask equipped with thermometer, mechanical stirrer, reflux condenser and addition funnel. An oil bath controlled by an electronic thermoregulator provided the necessary heat. Twenty-six ml of a 20% ether solution of $BF_3$ catalyst was introduced with continuous stirring. The ether readily evaporated, and the $BF_3$ went into solution with the TMP. It represented an 0.5% concentration based on the weight of the total reaction mixture. To the TMP solution was added slowly, 200 gm of melted epoxidized tallow (3.28% oxirane and 186.9 ester no.). The amounts of reactants used represent a functional ratio of 6.6. The temperature of the mixture was raised gradually to about 120° C., and the reaction was carried out for the period of about 1 hr. This time was sufficient to consume all epoxy groups by reaction with TMP. The $BF_3$ catalyst was now removed by sweeping with $N_2$ gas, and 5.2 gm (0.093 moles) of KOH pellets was added (providing a 1% concentration of KOH based on the weight of total mixture). The reaction was continued, under the same conditions, for about an additional 4 hrs. Then the temperature of the mixture was raised to about 150 C., and 295.4 gm (5.09 moles) of propylene oxide was added dropwise from the addition funnel under a nitrogen atmosphere, at the rate of about 2 ml per minute. The total reaction time was about 8 hrs. The reaction mixture was then neutralized with concentrated hydrochloric acid (total inorganic in product 7 gm) and dried by rotary evaporation under 0.25 mm of pressure. The final product, weighing 793.0 gm, was amber colored and liquid at room temperature. The weight increase based on the weight of epoxidized tallow, was 296.5%. During the oxypropylation reaction, 275.0 gm (4.73 moles) of propylene oxide was fixed (0.67 moles of propylene oxide per mole of OH from TMP). The above polyol was analyzed for viscosity and hydroxyl content. Thin layer chromatography (TLC) showed no unoxypropylated TMP in the product. Properties of polyol: hydroxyl equivalent, 125; viscosity (Brookfield) at 25° C., 3,725 cps. This product was ready for use in preparation of both low and high density rigid urethane foams.

EXAMPLE 3

The polyol described in Example 1 was mixed with triisopropanol to give a polyol mixture having an equivalent weight of 100. This was used to prepare a low density rigid polyurethane foam based upon the following formulation:

|  | Parts by Weight |
|---|---|
| Polyol of Example 1 | 5.30 |
| Triisopropanolamine (OH Eq. 66) | 4.70 |
| Dabco-33 Lv* | 0.25 |
| trichlorofluoromethane (Freon-11) | 4.10 |
| PAPI** | 14.70 |
| Silicone L-530 Surfactant*** | 0.16 |

*1 part triethylenediamine and 2 parts dipropylene glycol
**A dark-brown medium viscosity polymethylene polyphenylisocyanate of lower reactivity and an average functionality of 2.7, isocyanate equivalent of 133.5, NCO content of 31.5%, acidity as HCl of 0.15%, viscosity at 25° C of 275 cps, average molecular weight of 340-380.
***Nonionic liquid organosilicone block copolymer having a viscosity at 25° C of 2000 centistokes and a specific gravity at 25/25° C of 1.03

The polyols, triethylenediamine, and blowing agent were mixed together separately and then poured into a 9-oz paper cup containing a mixture of the polyisocyanate and silicone surfactant. The mass was blended together by mechanical stirring for 12–15 seconds and allowed to foam unrestricted. Rise was completed within 120 seconds and the initial cure within 125 seconds. A rigid uniform cellular foam resulted having a density of 1.7 lbs/ft$^3$ and a compressive strength of 24 psi (10% compression).

EXAMPLE 4

Following the procedure in Example 3 except that the polyol mixture was adjusted with triisopropanolamine to give an equivalent weight of 120, a low density rigid foam was prepared based on the following formulation:

|  | Parts by Weight |
|---|---|
| Polyol of Example 1 | 7.10 |
| Triisopropanolamine (OH Eq. 66) | 2.90 |
| Dabco-33 Lv | 0.25 |
| Trichlorofluoromethane (Freon-11) | 4.10 |
| PAPI | 12.20 |
| Silicone L-530 Surfactant | 0.16 |

The foam was prepared as described in Example 3 except that rise was completed within 130 seconds and the initial cure within 130 seconds. The foam had a density of 1.6 lbs/ft$^3$ and a compressive strength of 20.5 psi (10% compression).

EXAMPLE 5

A dense polyurethane rigid foam was prepared using only the polyol described in Example 1. The mixing and procedure was similar to that outlined for Example 4 except that the ingredients were somewhat modified as shown in the following formulation:

|  | Parts by Weight |
|---|---|
| Polyol of Example 1 | 40.00 |
| Dabco R8020* | 0.40 |
| Water | 0.16 |
| Mondur MR** | 32.40 |
| Silicone DC-193 Surfactant*** | 0.40 |

*20% triethylenediamine and 80% dimethylethanolamine
**a dark brown liquid polyisocyanate having a slight aromatic odor, an NCO content of 31.5%, amine equivalent of 132, viscosity at 25° C of 150-250 cps, specific gravity at 25° C of about 1.24, flash point (Cleveland Open Cup) of about 415° F, acidity of 0.2% maximum. Generally known in the art as p,p'-diphenylmethane diisocyanate.
***low viscosity silicane-glycol copolymer having, at 77° F, a viscosity of 465 centistokes, specific gravity of 1.07 and a refractive index of 1.4515

The polyol, triethylenediamine and water were blended together by stirring. To this was added the stirred solution of the p,p'-diphenylmethane diisocyanate and silicone surfactant. The resultant solution was mixed for 18 seconds. Rise was completed within 72 seconds and the initial cure within 75 seconds. The resulting foam was a rigid cellular material having a density 11.1 lbs/ft$^3$, compressive strength of 318 psi (10% compression) and flexural strength of 218 psi.

EXAMPLE 6

Following the procedure outlined for Example 5, except that 0.08 parts of water was employed as blowing agent, high density rigid foam was prepared based upon the following formulation:

|  | Parts by Weight |
| --- | --- |
| Polyol of Example 1 | 40.00 |
| Dabco R8020 | 0.40 |
| Water | 0.08 |
| Mondur MR | 30.10 |
| Silicone DC-193 Surfactant | 0.40 |

Ingredients were mixed as described under Example 5. Rise was completed within 90 seconds and initial cure within 95 seconds. A rigid uniform foam resulted having a density of 19.6 lbs/ft$^3$, a compressive strength of 880 psi (10% compression), flexural strength of 498 psi and screw holding strength of 15 in-lbs.

EXAMPLE 7

The polyol described in Example 2 was mixed with triisopropanolamine to give a polyol mixture having an equivalent weight of 100. A low density rigid polyurethane foam was prepared employing this polyol mixture according to the following formulation:

|  | Parts by Weight |
| --- | --- |
| Polyol of Example 2 | 7.20 |
| Triisopropanolamine | 2.80 |
| Dabco-33 Lv | 0.25 |
| Trichlorofluoromethane (Freon-11) | 4.10 |
| PAPI | 14.70 |
| Silicone L-530 Surfactant | 0.16 |

The polyols, triethylenediamine, and blowing agent were mixed together separately and then poured into a 9-oz paper cup containing a mixture of the polyisocyanate and silicone surfactant. The mass was blended together by mechanical stirring for 20-25 seconds and allowed to foam unrestricted. Rise was completed within 60 seconds and the initial cure within 65 seconds. The resulting foam was a rigid uniform cellular material having a density of 1.8 lbs./ft$^3$ and a compressive strength of 28 psi (10% compression).

EXAMPLE 8

Following the procedure in Example 7 except that the polyol mixture was adjusted with triisopropanolamine to give equivalent weight of 120. The formulation used follows:

|  | Parts by Weight |
| --- | --- |
| Polyol of Example 2 | 9.60 |
| Triisopropanolamine | 0.40 |
| Dabco-33 Lv | 0.25 |
| Trichlorofluoromethane (Freon-11) | 4.10 |
| PAPI | 12.20 |
| Silicon L-530 Surfactant | 0.16 |

The procedure was the same as that described under Example 7. The resultant foam required 60 seconds for completion of rise and for initial cure. The foam had a density of 1.7 lbs/ft$^3$, and a compressive strength of 30 psi (10% compression).

The process of this invention demonstrates that it is possible to decrease substantially the amount of propylene oxide required in prior art procedures of making polyols by using instead appropriate amounts of epoxidized tallow. Thus, a significant sparing of a petroleum-based chemical is effected by this process which uses a slightly modified fat derived from an agricultural source as a substitute.

We claim:

1. A process for preparing polyols suitable for use in urethane foams comprising the steps of:
    a) reacting, under acid catalysis, trimethylolpropane with epoxidized tallow;
    b) reacting, under alkaline catalysis trimethylolpropane with the product of step (a); and
    c) reacting the product of step (b) with propylene oxide.

2. The process of claim 1 in which the acid catalyst is boron trifluoride and the alkaline catalyst is potassium hydroxide.

3. The process of claim 2 in which the reaction of step (a) is conducted at about 120° C. for about 1 hour and the reaction of step (b) is conducted at about 120° C. for about 4 hours.

4. The process of claim 3 in which the temperature of the product of steps (a) and (b) is raised to about 150° C. prior to the addition of propylene oxide.

5. The process of claim 4 in which propylene oxide is added at the rate of about 2.0 ml per minute and the total reaction time is about 7 to 8 hours.

6. The process of claim 5 in which the ratio of the number of moles of hydroxyl function provided by the trimethylolpropane to the number of moles of oxirane plus ester function provided by the epoxidized tallow is from about 1.4 to about 6.6.

7. The process of claim 6 in which the functional ratio is 2.1.

8. The process of claim 6 in which the functional ratio is 6.6.

9. The process of claim 6 in which the hydroxyl content of the polyol product is varied by adjusting the amount of propylene oxide fixed in the reaction.

* * * * *